US011983800B2

(12) United States Patent
Vahala

(10) Patent No.: US 11,983,800 B2
(45) Date of Patent: May 14, 2024

(54) GENERATION OF PSEUDO RADIOGRAPHIC IMAGES FROM OPTICAL IMAGES

(71) Applicant: KONINKLIJKE PHILIPS N.V., Eindhoven (NL)

(72) Inventor: Erkki Tapani Vahala, Hyvinkaa (FI)

(73) Assignee: Koninklijke Philips N.V., Eindhoven (NL)

(*) Notice: Subject to any disclaimer, the term of this patent is extended or adjusted under 35 U.S.C. 154(b) by 553 days.

(21) Appl. No.: 17/282,013

(22) PCT Filed: Sep. 25, 2019

(86) PCT No.: PCT/EP2019/075793
§ 371 (c)(1),
(2) Date: Apr. 1, 2021

(87) PCT Pub. No.: WO2020/069930
PCT Pub. Date: Apr. 9, 2020

(65) Prior Publication Data
US 2021/0358119 A1  Nov. 18, 2021

(30) Foreign Application Priority Data
Oct. 2, 2018 (EP) .................................. 18198218

(51) Int. Cl.
G06T 7/00 (2017.01)
G06N 3/08 (2023.01)
G06T 11/00 (2006.01)

(52) U.S. Cl.
CPC .............. *G06T 11/006* (2013.01); *G06N 3/08* (2013.01); *G06T 7/0012* (2013.01);
(Continued)

(58) Field of Classification Search
CPC ................. G06T 11/006; G06T 7/0012; G06T 2207/10048; G06T 2207/10081;
(Continued)

(56) References Cited

U.S. PATENT DOCUMENTS 11,030,485 B2* 6/2021 Karam ................ G06F 18/2413
11,100,684 B2* 8/2021 Hein ..................... G06T 7/0012
(Continued)

FOREIGN PATENT DOCUMENTS

WO   2018048507 A1   3/2018
WO   WO2018048575   *   3/2018   ............... A61N 5/10
WO   2018069479 A1   4/2018

OTHER PUBLICATIONS

Suzuki Kenji et al "Neural Network Convolution for Converting Ultra-Low Dose to Virtual High Dose CT Images" Proc. Int. Conf. Adv. Biometrics p. 334-343 Retrieved on Sep. 7, 2017.
(Continued)

Primary Examiner — Jerome Grant, II

(57) ABSTRACT

The invention provides for a medical instrument comprising a memory storing machine executable instructions and an image transformation neural network trained for transforming an optical image of a subject into an output image. The output image comprises a pseudo radiographic image. The pseudo radiographic image is aligned with the optical image. The medical instrument further comprises a processor configured to control the medical imaging system. Execution of the machine executable instructions causes the processor to: receive the optical image of the subject and generate the output image by inputting the optical image into the image transformation neural network.

14 Claims, 7 Drawing Sheets

(52) U.S. Cl.
CPC ............... *G06T 2207/10048* (2013.01); *G06T 2207/10081* (2013.01); *G06T 2207/10088* (2013.01); *G06T 2207/10108* (2013.01); *G06T 2207/10116* (2013.01); *G06T 2207/20081* (2013.01)

(58) Field of Classification Search
CPC . G06T 2207/10088; G06T 2207/10108; G06T 2207/10116; G06T 2207/20081; G06N 3/08
USPC .......................................................... 382/131
See application file for complete search history.

(56) References Cited

U.S. PATENT DOCUMENTS

| | | | | |
|---|---|---|---|---|
| 11,144,814 | B2* | 10/2021 | Cha | G06T 7/001 |
| 11,222,415 | B2* | 1/2022 | Ozcan | G06N 3/048 |
| 11,331,056 | B2* | 5/2022 | Kalafut | A61B 6/504 |
| 11,495,041 | B2* | 11/2022 | Derakhshani | G06V 40/1382 |
| 11,551,353 | B2* | 1/2023 | Golden | G06N 3/08 |
| 2011/0286649 | A1 | 11/2011 | Reisman et al. | |
| 2014/0212013 | A1 | 7/2014 | Han | |
| 2016/0073979 | A1 | 3/2016 | Braun et al. | |
| 2016/0109545 | A1 | 4/2016 | Fortmann et al. | |
| 2017/0100078 | A1 | 4/2017 | Han | |
| 2017/0100089 | A1 | 4/2017 | Chang et al. | |
| 2018/0025466 | A1 | 1/2018 | Mazurkewitz et al. | |
| 2018/0242905 | A1* | 8/2018 | Madabhushi | G06F 18/241 |
| 2018/0341858 | A1* | 11/2018 | Otterstedt | G06V 10/82 |
| 2019/0139202 | A1* | 5/2019 | Mayer | G06V 10/764 |

OTHER PUBLICATIONS

International Search Report and Written Opinion from PCT/EP2019/075793 dated Apr. 9, 2020.

* cited by examiner

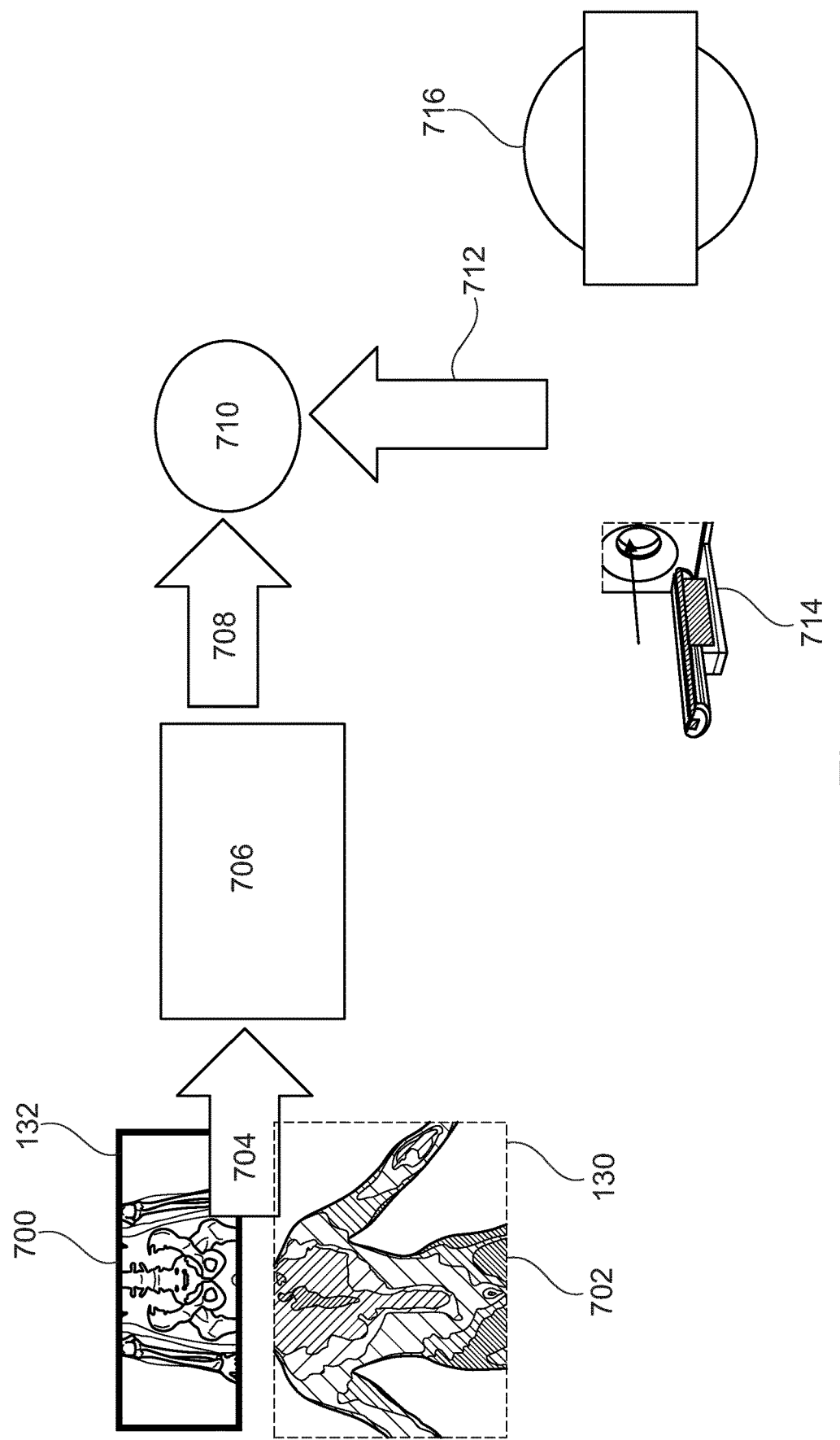

GENERATION OF PSEUDO RADIOGRAPHIC IMAGES FROM OPTICAL IMAGES

CROSS REFERENCE TO RELATED APPLICATIONS

This application is a U.S. national phase application of International Application No. PCT/EP2019/075793 filed on Sep. 25, 2019, which claims the benefit of EP Application Serial No. 18198218.2 filed on Oct. 2, 2018 and is incorporated herein by reference.

FIELD OF THE INVENTION

The invention relates to medical imaging, in particular to planning for the acquisition of medical imaging

BACKGROUND OF THE INVENTION

In various medical imaging modalities such a magnetic resonance imaging, computed tomography, or positron emission tomography the subject need to be positioned properly and also in many cases the medical imaging system needs to have its region of interest adjusted to image a desired anatomical region. Very often, initial survey scans are taken of the subject and the position of the subject and/or the adjustment of the region of interest is adjusted. This may be a time-consuming process, and in the case of some techniques such as computed tomography it may expose the subject to additional ionizing radiation.

United States patent application US 2016/0073979 A1 discloses determining anatomical landmarks on a patient by virtue of anatomical landmarks being called up from a database with an anatomical model and being converted into individual body dimensions and an individual position of the patient. As a result, anatomical landmarks may be called up from a database, calculated individually for the patient and used as an item of reference location information. The positioning of the patient table is thus considerably accelerated, wherein the accuracy is also improved. Thus, the item of reference location information may be calculated individually for the same patient in a different position or a different patient with different body dimensions by virtue of this item of reference location information being recalculated by the conversion rule for the respective patient.

SUMMARY OF THE INVENTION

The invention provides for a medical instrument, a computer program product and a method in the independent claims. Embodiments are given in the dependent claims.

Embodiments provide a means of producing a pseudo radiographic image from an optical image of the subject. The pseudo radiographic image may for example be used in place of a survey image or be useful in the initial positioning of the subject and/or adjustment of the region of interest. This may be accomplished by taking an optical image, such as a normal color image, a black and white image, or even an infra-red image and inputting it into an image transformation neural network. The image transformation neural network has been trained such that it outputs an output image. The output image either is or comprises a pseudo radiographic image. The pseudo radiographic image may be a representation of a realistic radiographic image or an idealized one.

From an optical image of a subject alone it would not be possible to provide a replacement for a real magnetic resonance image or a real computed tomography image. However, the pseudo radiographic image may be used to accurately indicate the location of anatomical structures within the subject. This may for example may be useful for planning medical imaging or radiotherapy of the subject.

In one aspect the invention provides for a medical instrument comprising a memory for storing machine-executable instructions and an image transformation neural network that is trained for transforming an optical image of a subject into an output image. The output image comprises a pseudo radiographic image. The pseudo radiographic image is aligned with the optical image. The medical instrument further comprises a processor configured for controlling the medical imaging system. Execution of the machine-executable instructions causes the processor to receive the optical image of the subject and then to generate the output image by inputting the optical image into the image transformation neural network.

This embodiment may have the benefit that a normal optical image can be used to provide reliable anatomical landmarks which can be used for such things as positioning a subject for medical imaging.

The image transformation neural network may be one of a variety of types of neural networks which is used for image processing. In one example the image transformation neural network is a fully connected neural network with multiple hidden layers. The input to the image transformation neural network may be an image as well as the output. In another example the image transformation neural network is a neural network that has a convolutional neural network with successive convolutional layers. The spatial dimensions of the feature maps match those of the input and output images. In other examples the image transformation neural network may be a convolutional neural network that has residual blocks and/or skip connections. In another example the image transformation neural network may be an encoder-decoder type convolutional neural network. This may be equivalent to an auto encoder which has been trained to output a different type of image. For example, autoencoders may be trained to learn a new representation.

A pseudo radiographic image as used herein is a radiographic image such as an MRI or CT image that has been generated artificially. The output image may take different forms in different examples. In one example the output image may comprise a super position of the optical image and a pseudo radiographic image. In other examples the output image may only be the pseudo radiographic image. If the image transformation neural network is only trained for outputting the pseudo radiographic image a super position may be easily computed using normal image processing techniques.

In some embodiments the optical image is an optical image looking at a coronal plane of the subject and this is to image the surface of the subject. In other examples the optical image may be used to image other views of the subject also.

In some embodiments there is a one-to-one mapping between the input and output images. For example, the input image may have a certain size or dimensions in pixels or voxels. The output image may have the same dimension or larger so that the entire output image can be represented. In other examples the output image may have a larger or different volume. For example, an image of the coronal plane or the face or skull of the subject may be used to generate a pseudo radiographic image with three-dimensional data. In some examples the optical image contains more information. There may for example be multiple cameras, a 3D image or even a 3D stack of images. Likewise, the optical image may comprise data views from multiple cameras or multiple slice outputs from the pseudo radiographic image.

In another embodiment the image transformation neural network is trained using deep learning.

In another embodiment the image transformation neural network is a normal image transformation network that is formed from two convolutional neural networks.

In another embodiment a possible implementation is that the image transformation neural network is a perceptual adversarial network. This may be particularly beneficial when training views which are not visible by the camera.

In another embodiment the pseudo radiographic image may be a survey-like radiographic image. In another example the pseudo radiographic image may comprise a skeleton model or classification or 3D rendering or similar cartoonish rendering of the anatomical structures of a subject.

In another embodiment the medical instrument further comprises a medical imaging system configured for acquiring a measured radiographic image of the subject. The radiographic image may be any of the normal modes of radiographic image that are typically acquired by medical imaging systems found in radiology departments. This would include imaging techniques such as magnetic resonance imaging, computer tomography and nuclear medical imaging techniques such as positron emission tomography.

The medical instrument further comprises a subject support configured for supporting the subject in the medical imaging system. The medical instrument further comprises a camera configured for acquiring the optical image of the subject on the subject support. Images acquired using the camera are registered to a coordinates system of the medical imaging system. Execution of the machine-executable instructions further causes the processor to acquire the optical image of the subject. Execution of the machine-executable instructions further causes the processor to register the location of the subject to the coordinates system of the medical imaging system using the output image.

This embodiment may be beneficial because in this embodiment the camera acquires the optical image and then the resulting output image is used to register the location of the subject. The output image comprises the pseudo radiographic image which may be used to provide a good estimate of the location of various anatomical structures within the subject. This may have the benefit of facilitating the imaging of the subject in the medical instrument.

In another embodiment the medical instrument further comprises a display on the user interface. Execution of the machine-executable instructions further causes the processor to display the output image on the display. Execution of the machine-executable instructions further causes the processor to receive location data from the user interface. The location data is descriptive of at least one location in the output image. For example, the output image may be displayed on a display for an operator or physician using the medical imaging system. As the pseudo radiographic image essentially provides an estimate of the anatomical structures within the subject the selection of the location data from the user interface provides instructions on which regions of the subject to image without performing a survey scan. This may for example help to accelerate the acquisition of medical images from expensive medical imaging systems such as computer tomography or magnetic resonance imaging systems.

In another embodiment execution of the machine-executable instructions further causes the processor to receive an anatomical image. The anatomical image comprises location markers. Execution of the machine-executable instructions further causes the processor to register the anatomical image to the output image. Execution of the machine-executable instructions further causes the processor to determine location data from the location markers by applying the registration of the anatomical image to the output image. For example, the anatomical image may be an actual anatomical image such as a CT or MR scan of the subject. The anatomical image may also be an idealized or cartoonish type drawing which is used to indicate various anatomical locations on a subject.

The location markers could be coordinates or even markers or boxes drawn on the anatomical image. The anatomical image may have features which are comparable or mappable onto the pseudo radiographic image. As the pseudo radiographic image indicates particular locations in the subject the registration of the anatomical image identifies where the location markers are on the subject. This may be useful in providing a means to identify a location of the subject to image with the medical imaging system.

In another embodiment the memory further contains a location finding neural network configured for receiving the output image and a semantic locator location descriptor. The location finding neural network is trained for outputting location data identifying a location of the semantic location descriptor in the output image. Execution of the machine-executable instructions further causes the processor to receive the semantic location descriptor of an anatomical location. Execution of the machine-executable instructions further causes the processor to determine location data by inputting the output image and the semantic location descriptor into the location finding neural network.

For example, the semantic location descriptor could be an audio or text data which contains a semantic message. This message may then indicate a region of the subject which is desired to be imaged using the medical imaging system. The location finding neural network may be trained to identify different anatomical locations in the pseudo radiographic image or in normal radiographic images. This embodiment may be beneficial because it may provide for a means for automatically interpreting a physician's orders to image a particular region of the subject.

For example, the subject could be placed onto a subject support and then imaged with the camera. The optical image is input into the image transformation neural network and the pseudo radiographic image is output then. The command or instructions from the physician or operator take the semantic location descriptor and input this into the location finding neural network along with the pseudo radiographic image. The neural network is then able to identify this region and provides the location data. The location data may for example be used to determine which portion of the subject to image with the medical imaging system.

The location finding neural network may be trained by tagging various regions of pseudo radiographic images or radiographic images and then using these labels to train the location finding neural network using deep learning. The location finding neural network may for example be a convolutional neural network.

In another embodiment the medical imaging system is configured for acquiring the measured radiographic image from a region of interest. Execution of the machine-executable instructions further causes the processor to determine the region of interest using the location data. Execution of the machine-executable instructions further causes the processor to control the medical imaging system to acquire the measured radiographic image from the subject from the region of interest. This embodiment may be beneficial because the control of the medical imaging system may be performed automatically once the location data is determined.

In another embodiment the medical imaging system is a positron emission tomography system.

In another embodiment the medical imaging system is a single photon emission tomography system.

In another embodiment the medical imaging system is a computed tomography system.

In another embodiment the medical imaging system is an X-ray machine.

In another embodiment the medical imaging system is a magnetic resonance imaging system.

In another embodiment the camera is an optical camera. This for example may be beneficial because normal optical cameras may be used to take images of the subject easily. In some examples the camera may be multiple cameras. For example, instead of having a single camera which images the subject when the subject is outside of the medical imaging system a larger number of smaller cameras may be used for making a composite image of the subject. For example, small inexpensive cameras such as are used in mobile telephones may be distributed along the bore of a magnetic resonance imaging system. The optical image may therefore be acquired of the subject when the subject is already in place.

In another embodiment the camera is an infra-red camera. The use of an infra-red camera may be beneficial because it may be used to image the subject's body heat. This may for example enable effective imaging of the subject even when the subject is wearing garments or covered. This may provide for more comfort of the subject when the optical image is acquired.

In another embodiment execution of the machine-executable instructions further causes the processor to receive matched pairs of optical training images and radiological training images. Execution of the machine-executable instructions further causes the processor to input one of the optical training images into the image transformation neural network to generate a test image. There is a matching radiological training image selected from the radiological training images that is a matched pair of the one of the optical training images. Execution of the machine-executable instructions further causes the processor to train the image transformation neural network using a difference between the test image and the matching radiological training image.

This embodiment may be beneficial because it may provide for means of effectively training the image transformation neural network for a particular medical imaging system. This may be accomplished for example using deep learning.

In another embodiment the pseudo radiographic image is any one of the following: a pseudo X-ray, a pseudo magnetic resonance image, a projection of a pseudo magnetic resonance image onto a plane, a cross-section of a pseudo magnetic resonance image, a pseudo positron emission tomography image, a projection of a pseudo positron emission tomography image onto a plane, a cross-section of a pseudo positron emission tomography image, a pseudo computer tomography image, a projection of a pseudo computer tomography image onto a plane, and a cross-section of a pseudo computer tomography image.

In another aspect the invention provides for a computer program product comprising machine-executable instructions for execution by a processor controlling the medical instrument. The computer program product further comprises an implementation of an image transformation neural network trained for transferring an optical image of the subject into an output image. The output image comprises a pseudo radiographic image. The pseudo radiographic image is aligned with the optical image. Execution of the machine-executable instructions causes the processor to receive the optical image of the subject. Execution of the machine-executable instructions further causes the processor to generate the output image by inputting the optical image into the image transformation neural network. The advantages of this system have been previously discussed.

In another aspect the invention provides for a medical imaging method. The method comprises receiving an optical image of a subject. The method further comprises generating an output image by inputting the optical image into the image transformation neural network. The image transformation neural network is trained for transforming an optical image of the subject into an output image. The output image comprises a pseudo radiographic image. The pseudo radiographic image is aligned with the optical image. The advantages of this method have been previously discussed.

In another embodiment the method further comprises receiving matched pairs of optical training images and radiological training images. The method further comprises inputting one of the optical training images into the image transformation neural network to generate a test image. There is a matching radiological training image selected from the radiological training images that is a matched pair of the one of the optical training images. The method further comprises training the image transformation neural network using a difference between the test image and the matching radiological training image.

It is understood that one or more of the aforementioned embodiments of the invention may be combined as long as the combined embodiments are not mutually exclusive.

As will be appreciated by one skilled in the art, aspects of the present invention may be embodied as an apparatus, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer executable code embodied thereon.

Any combination of one or more computer readable medium(s) may be utilized. The computer readable medium may be a computer readable signal medium or a computer readable storage medium. A 'computer-readable storage medium' as used herein encompasses any tangible storage medium which may store instructions which are executable by a processor of a computing device. The computer-readable storage medium may be referred to as a computer-readable non-transitory storage medium. The computer-readable storage medium may also be referred to as a tangible computer readable medium. In some embodiments, a computer-readable storage medium may also be able to store data which is able to be accessed by the processor of the computing device. Examples of computer-readable storage media include, but are not limited to: a floppy disk, a magnetic hard disk drive, a solid-state hard disk, flash memory, a USB thumb drive, Random Access Memory (RAM), Read Only Memory (ROM), an optical disk, a magneto-optical disk, and the register file of the processor. Examples of optical disks include Compact Disks (CD) and Digital Versatile Disks (DVD), for example CD-ROM, CD-RW, CD-R, DVD-ROM, DVD-RW, or DVD-R disks. The term computer readable-storage medium also refers to various types of recording media capable of being accessed by the computer device via a network or communication link. For example, a data may be retrieved over a modem, over the internet, or over a local area network. Computer executable code embodied on a computer readable medium may be transmitted using any appropriate medium, including but not limited to wireless, wire line, optical fiber cable, RF, etc., or any suitable combination of the foregoing.

A computer readable signal medium may include a propagated data signal with computer executable code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

'Computer memory' or 'memory' is an example of a computer-readable storage medium. Computer memory is any memory which is directly accessible to a processor. 'Computer storage' or 'storage' is a further example of a computer-readable storage medium. Computer storage is any non-volatile computer-readable storage medium. In some embodiments computer storage may also be computer memory or vice versa.

A 'processor' as used herein encompasses an electronic component which is able to execute a program or machine executable instruction or computer executable code. References to the computing device comprising "a processor" should be interpreted as possibly containing more than one processor or processing core. The processor may for instance be a multi-core processor. A processor may also refer to a collection of processors within a single computer system or distributed amongst multiple computer systems. The term computing device should also be interpreted to possibly refer to a collection or network of computing devices each comprising a processor or processors. The computer executable code may be executed by multiple processors that may be within the same computing device or which may even be distributed across multiple computing devices.

Computer executable code may comprise machine executable instructions or a program which causes a processor to perform an aspect of the present invention. Computer executable code for carrying out operations for aspects of the present invention may be written in any combination of one or more programming languages, including an object-oriented programming language such as Java, Smalltalk, C++ or the like and conventional procedural programming languages, such as the "C" programming language or similar programming languages and compiled into machine executable instructions. In some instances, the computer executable code may be in the form of a high level language or in a pre-compiled form and be used in conjunction with an interpreter which generates the machine executable instructions on the fly.

The computer executable code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It is understood that each block or a portion of the blocks of the flowchart, illustrations, and/or block diagrams, can be implemented by computer program instructions in form of computer executable code when applicable. It is further under stood that, when not mutually exclusive, combinations of blocks in different flowcharts, illustrations, and/or block diagrams may be combined. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

A 'user interface' as used herein is an interface which allows a user or operator to interact with a computer or computer system. A 'user interface' may also be referred to as a 'human interface device.' A user interface may provide information or data to the operator and/or receive information or data from the operator. A user interface may enable input from an operator to be received by the computer and may provide output to the user from the computer. In other words, the user interface may allow an operator to control or manipulate a computer and the interface may allow the computer indicate the effects of the operator's control or manipulation. The display of data or information on a display or a graphical user interface is an example of providing information to an operator. The receiving of data through a keyboard, mouse, trackball, touchpad, pointing stick, graphics tablet, joystick, gamepad, webcam, headset, pedals, wired glove, remote control, and accelerometer are all examples of user interface components which enable the receiving of information or data from an operator.

A 'hardware interface' as used herein encompasses an interface which enables the processor of a computer system to interact with and/or control an external computing device and/or apparatus. A hardware interface may allow a processor to send control signals or instructions to an external computing device and/or apparatus. A hardware interface may also enable a processor to exchange data with an external computing device and/or apparatus. Examples of a hardware interface include, but are not limited to: a universal serial bus, IEEE 1394 port, parallel port, IEEE 1284 port, serial port, RS-232 port, IEEE-488 port, Bluetooth connection, Wireless local area network connection, TCP/IP connection, Ethernet connection, control voltage interface, MIDI interface, analog input interface, and digital input interface.

A 'display' or 'display device' as used herein encompasses an output device or a user interface adapted for displaying images or data. A display may output visual, audio, and or tactile data. Examples of a display include, but are not limited to: a computer monitor, a television screen, a touch screen, tactile electronic display, Braille screen, Cathode ray tube (CRT), Storage tube, Bi-stable display, Electronic paper, Vector display, Flat panel display, Vacuum fluorescent display (VF), Light-emitting diode (LED) displays, Electroluminescent display (ELD), Plasma display panels (PDP), Liquid crystal display (LCD), Organic light-emitting diode displays (OLED), a projector, and Head-mounted display.

Magnetic Resonance (MR) data is defined herein as being the recorded measurements of radio frequency signals emitted by atomic spins using the antenna of a Magnetic resonance apparatus during a magnetic resonance imaging scan. MRF magnetic resonance data is magnetic resonance data. Magnetic resonance data is an example of medical image data. A Magnetic Resonance Imaging (MRI) image or MR image is defined herein as being the reconstructed two- or three-dimensional visualization of anatomic data contained within the magnetic resonance imaging data. This visualization can be performed using a computer.

BRIEF DESCRIPTION OF THE DRAWINGS

In the following preferred embodiments of the invention will be described, by way of example only, and with reference to the drawings in which:

FIG. 7 illustrates an example of a method of training an image transformation neural network.

DETAILED DESCRIPTION OF THE EMBODIMENTS

Like numbered elements in these figures are either equivalent elements or perform the same function. Elements which have been discussed previously will not necessarily be discussed in later figures if the function is equivalent.

Figure 1:
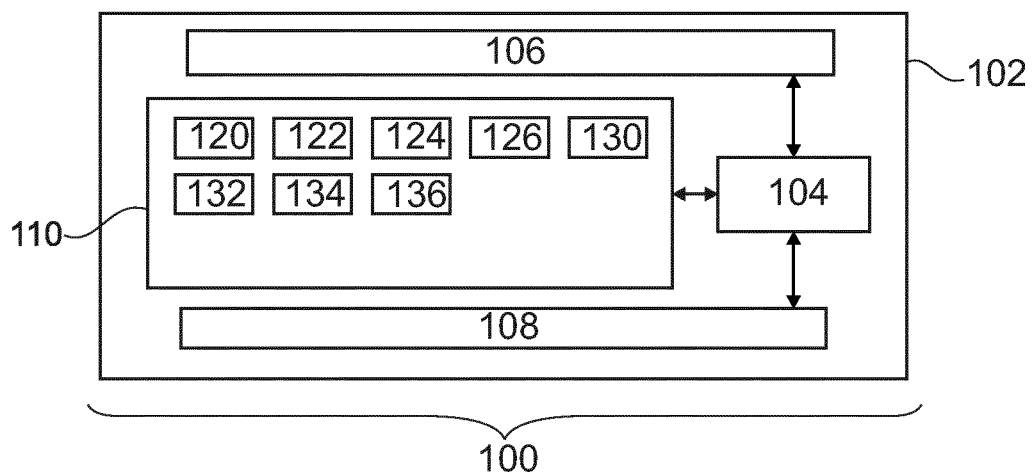
FIG. 1 illustrates and example of a medical instrument.

FIG. 1 illustrates an example of a medical instrument 100. The medical instrument 100 in FIG. 1 comprises a computer 102. The computer 102 comprises a processor 104 that is in communication with an optional hardware interface 106, an optional user interface 108, and a memory 110. The memory 110 may be any combination of memory which is accessible to the processor 104. This may include such things as main memory, cached memory, and also non-volatile memory such as flash RAM, hard drives, or other storage devices. In some examples the memory 104 may be considered to be a non-transitory computer-readable medium. The hardware interface 106 may for example be used to communicate with other computer systems and/or to control other components of the medical instrument 100. The user interface 108 may for example be used for displaying of data and/or for receiving commands or other information from a user or operator.

The memory 110 is shown as containing machine-executable instructions 120. The machine-executable instructions 120 contain commands which enable the processor 104 to control the medical instrument 100. The machine-executable instructions 120 may also control other commands which enable the processor 104 to perform various types of image processing.

The memory 110 is further shown as containing an image transformation neural network 122. The image transformation neural network 122 takes an image as input and outputs another image. The image transformation neural network 122 has been trained to take an image of a subject and to output a pseudo radiological image. The memory 110 is shown as containing an optical image 124 of a subject. The memory 110 is further shown as containing an output image that comprises a pseudo radiological image that was obtained by inputting the optical image 124 into the image transformation neural network 122. In some instances, the output image is simply the pseudo radiological image.

The memory 110 is shown as containing an optional optical training image 130. The memory 110 is further shown as containing an optional radiological training image 132. The optical training image 130 and the radiological training image 132 may be considered to be a matched pair. They are both obtained from a subject when the subject was on a support. For example, the optical training image 130 could be an image that was obtained of a subject on a subject support about to be placed into a magnetic resonance imaging system and the radiological training image 132 may be an image of the subject taken by the magnetic resonance imaging system. The memory 110 further contains a test image 134 that was obtained by inputting the optical training image 130 into the image transformation neural network 122. The test image 134 and the radiological training image 132 are then used to create or calculate a difference between the two images 136. This difference 136 is then used to further train the image transformation neural network 122. For example, this could be performed using deep learning.

Figure 2:
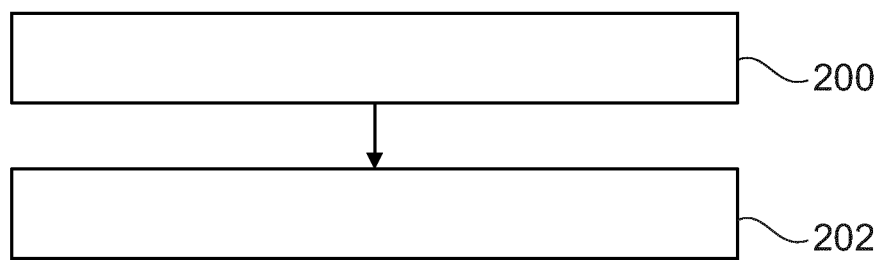
FIG. 2 shows a flow chart which illustrates a method of operating the medical instrument of FIG. 1.

FIG. 2 shows a flowchart which illustrates a method of operating the medical instrument 100 of FIG. 1. First in step 200 the optical image 124 is received. The receiving of the optical image could be performed in different ways. In one example there could be a camera and the receiving of the optical image comprises acquiring the image using the camera. In other examples receiving the optical image could include accessing it from the memory 110, obtaining it via network connection 106 or be from other data carrying medium. The method then proceeds to step 202. In step 202 the output image 126 is generated by inputting the optical image 124 into the image transformation neural network 122.

Figure 3:
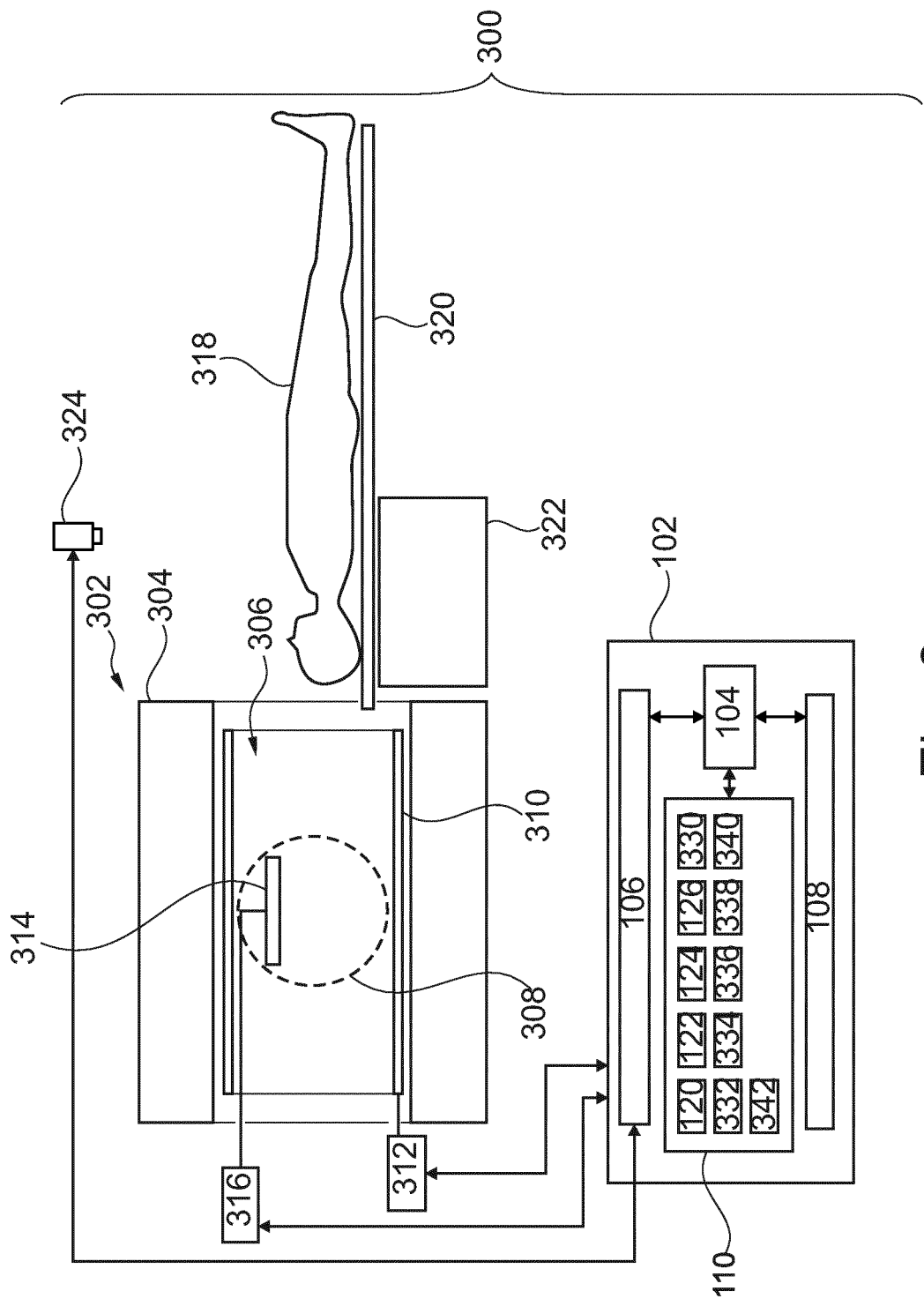
FIG. 3 illustrates a further example of a medical instrument.

FIG. 3 illustrates a further example of a medical instrument 300. The medical instrument 300 is shown as additionally comprising a magnetic resonance imaging system 302 and a camera 324. In this example a magnetic resonance imaging system 302 was used, however it is intended to be illustrative and the magnetic resonance imaging system 302 may be replaced with other medical imaging systems such as a computer tomography system or a positron emission tomography system.

The magnetic resonance imaging system 302 comprises a magnet 304. The magnet 304 is a superconducting cylindrical type magnet with a bore 306 through it. The use of different types of magnets is also possible; for instance it is also possible to use both a split cylindrical magnet and a so called open magnet. A split cylindrical magnet is similar to a standard cylindrical magnet, except that the cryostat has been split into two sections to allow access to the iso-plane of the magnet, such magnets may for instance be used in conjunction with charged particle beam therapy. An open magnet has two magnet sections, one above the other with a space in-between that is large enough to receive a subject: the arrangement of the two sections area similar to that of a Helmholtz coil. Open magnets are popular, because the subject is less confined. Inside the cryostat of the cylindrical magnet there is a collection of superconducting coils. Within the bore 306 of the cylindrical magnet 304 there is an imaging zone 308 where the magnetic field is strong and uniform enough to perform magnetic resonance imaging.

Within the bore 306 of the magnet there is also a set of magnetic field gradient coils 310 which is used for acquisition of preliminary magnetic resonance data to spatially encode magnetic spins within the imaging zone 308 of the magnet 304. The magnetic field gradient coils 310 connected to a magnetic field gradient coil power supply 312. The magnetic field gradient coils 310 are intended to be representative. Typically magnetic field gradient coils 310 contain three separate sets of coils for spatially encoding in three orthogonal spatial directions. A magnetic field gradient power supply supplies current to the magnetic field gradient coils. The current supplied to the magnetic field gradient coils 310 is controlled as a function of time and may be ramped or pulsed.

Adjacent to the imaging zone 308 is a radio-frequency coil 314 for manipulating the orientations of magnetic spins within the imaging zone 308 and for receiving radio transmissions from spins also within the imaging zone 308. The radio frequency antenna may contain multiple coil elements. The radio frequency antenna may also be referred to as a channel or antenna. The radio-frequency coil 314 is connected to a radio frequency transceiver 316. The radio-frequency coil 314 and radio frequency transceiver 316 may be replaced by separate transmit and receive coils and a separate transmitter and receiver. It is understood that the radio-frequency coil 314 and the radio frequency transceiver 316 are representative. The radio-frequency coil 314 is intended to also represent a dedicated transmit antenna and a dedicated receive antenna. Likewise the transceiver 316 may also represent a separate transmitter and receivers. The radio-frequency coil 314 may also have multiple receive/transmit elements and the radio frequency transceiver 316 may have multiple receive/transmit channels. For example if a parallel imaging technique such as SENSE is performed, the radio-frequency could 314 will have multiple coil elements.

The transceiver 316 and the gradient controller 312 are shown as being connected to a hardware interface 328 of a computer system 326. The subject 318 is shown as being outside of the bore 306 of the magnet 304. The subject support 320 is connected to an actuator 322 for moving the subject support 320. The actuator 322 enables the subject 318 to be moved in and out of the bore 306 of the magnet 304. In the current position the subject 318 is positioned below the camera 324. The camera 324 is able to be controlled by the processor 104 to acquire the optical image 124.

Once the optical image is acquired the optical image 124 was input into the image transformation neural network 122 to generate the output image 126 which comprises or is a pseudo radiographic image. From the pseudo radiographic image 126 location data 332 is derived. This may be performed in different ways. For example, the user interface 108 could display the output image 126 and receive input data which is then used to derive the location data. For example, an operator or physician could put markings on the output image to indicate where a region of interest should be. The position of the camera 324 can be registered to the coordinates system of the magnetic resonance imaging system.

The location data 332 can then be used to determine directly the location of a region of interest 334. Several alternatives also exist. For example, the processor 104 could receive an anatomical image 336 which is shown as being stored in the memory 110. The anatomical image 336 may comprise an image or representation of an image that is marked up with a desired region of interest. The anatomical image 336 may then be registered 338 to the output image to create a registration 338 of the anatomical image to the output image. This registration 338 enables the markings on the anatomical image 336 to be used to determine the location of the region of interest 334. In yet another example a semantic location descriptor 340 may be received. This may for example be a verbal or text command to perform a particular imaging protocol or a description of a particular anatomical region to image. The semantic location descriptor 340 may be input into a location finding neural network 342 as well as the pseudo radiographic image 126 which then outputs the location of the region of interest 334. The memory is further shown as containing pulse sequence commands 330. The pulse sequence commands 330 enable the processor 104 to acquire magnetic resonance data from the subject 318 at the region of interest.

Figure 4:
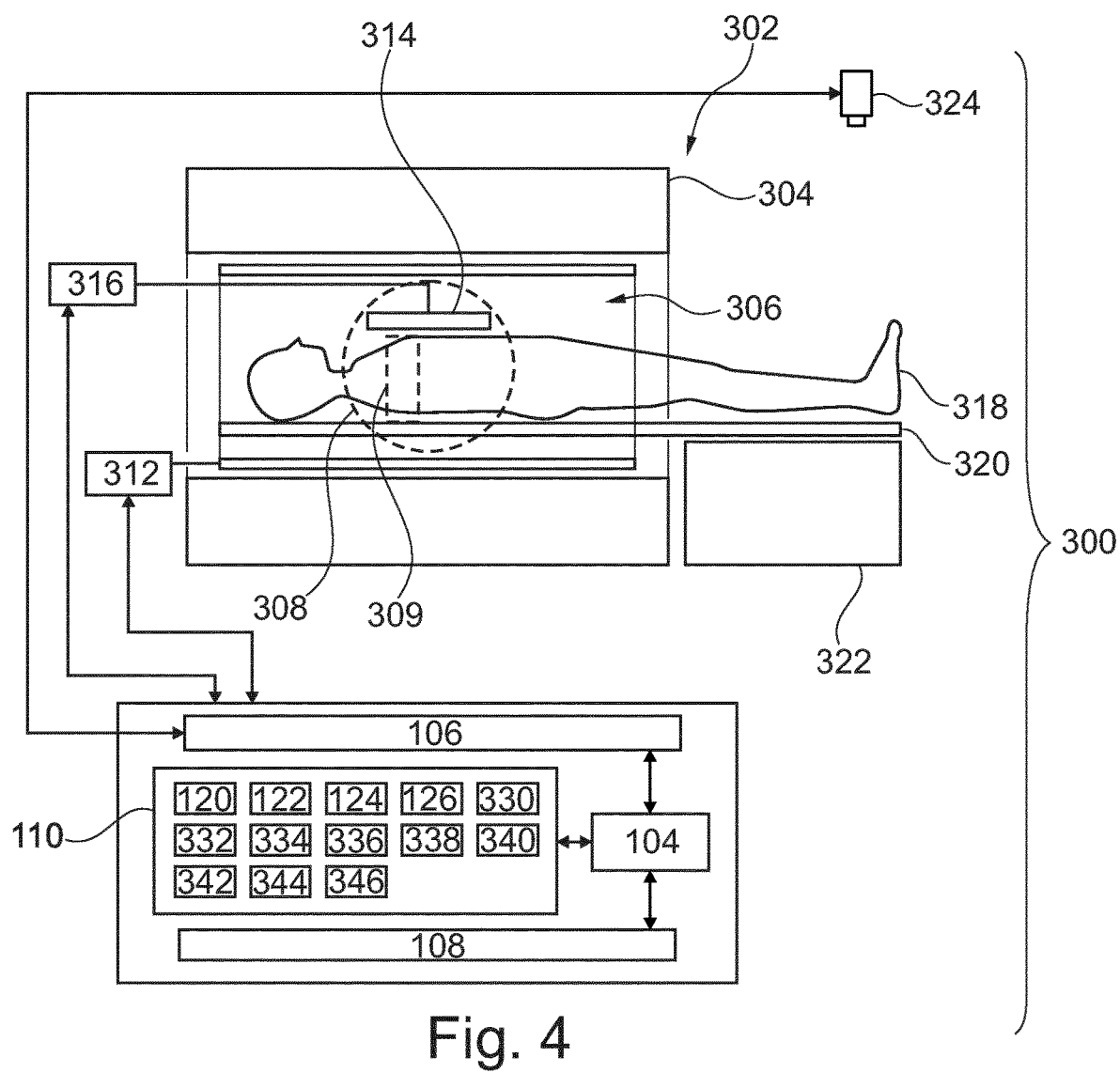
FIG. 4 shows a further view of the medical instrument of FIG. 3.

FIG. 4 shows the same medical imaging system in FIG. 3 except the subject 318 has now been moved by the actuator 322 into the bore 306 of the magnet 304. A region of interest 309 can be seen as being positioned within the imaging zone 308. The position of the region of interest was determined using the location 334. The memory 110 is further shown as containing magnetic resonance data 344 that was acquired using the pulse sequence commands 334 to acquire data from the region of interest 309. The memory 110 is further shown as containing a magnetic resonance image 346 that was reconstructed from the magnetic resonance data 344.

Figure 5:
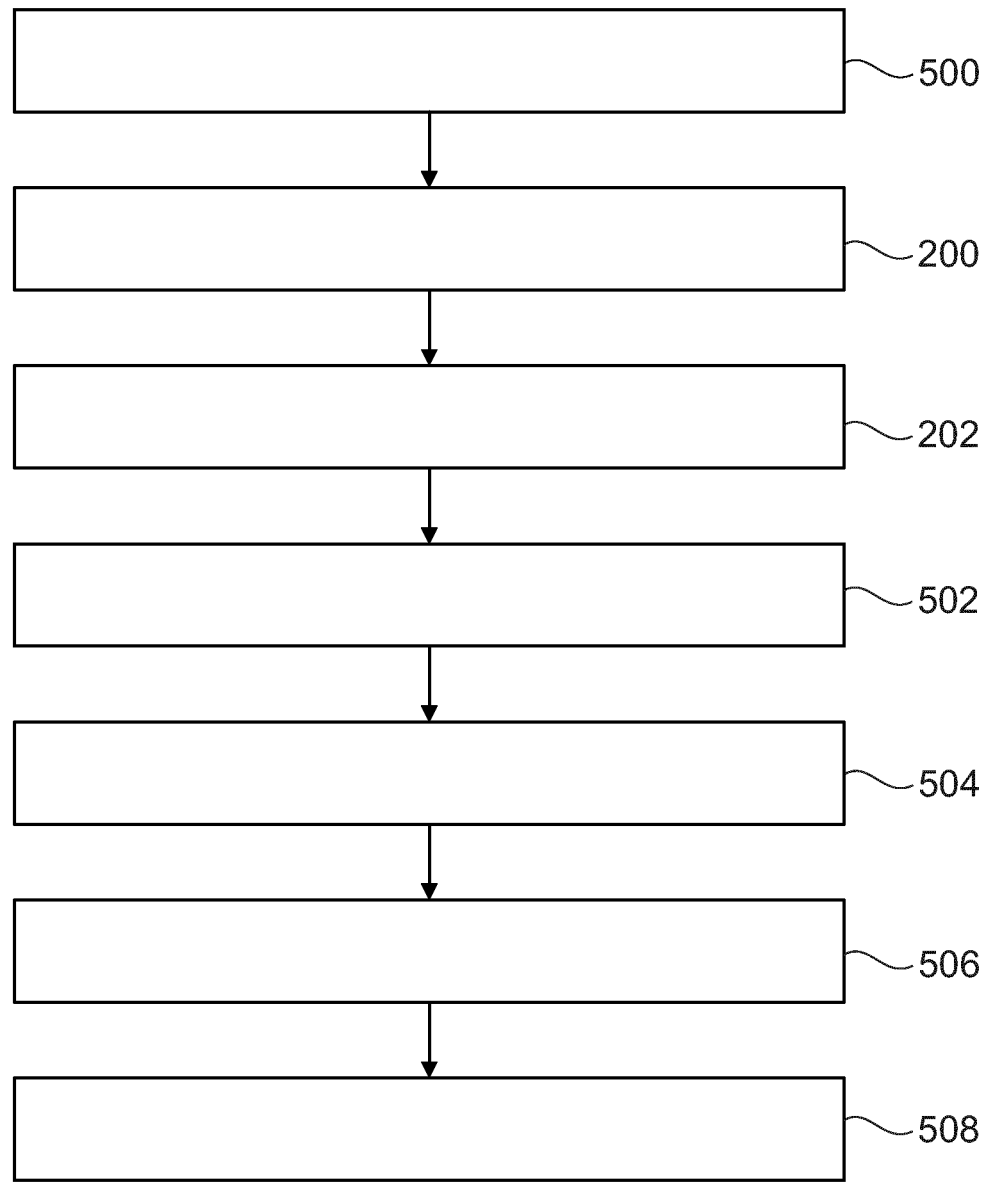
FIG. 5 shows a flow chart which illustrates a method of operating the medical instrument of FIG. 3.

FIG. 5 shows a flowchart which illustrates a method of operating the medical instrument 300 illustrated in FIGS. 3 and 4. First in step 500 the processor 104 controls the camera 324 to acquire the optical image 124. Next in step 200 the optical image 124 is received by the processor. Next in step 202 the processor generates the output image 126 or the pseudo radiographic image by inputting the optical image 124 into the image transformation neural network 122. Next in step 502 the location of the subject 318 is registered to the coordinates system of the medical imaging system or magnetic resonance imaging system 302 using the output image 126. Next in step 504 the location data 322 is determined using the output image 126. This may be accomplished in any of the ways which have been previously discussed such as displaying the output image on a user interface and using markings on this to determine the location data. Next in step 506 the region of interest 309 is determined using the location data 332. The location for example can be stored as location 334 as shown in the memory. Finally, in step 508 the medical imaging system 302 is controlled by the processor to acquire the measured radiographic image 346 from the region of interest 309. In this particular example the measured radiographic image is a magnetic resonance image 346.

Presently, the state of the art in Radiation Oncology simulation scanning is to use survey scans to position the main scanning field-of-view (region or interest 309) onto the subject 318. The instructions to position the scanning volume comes typically as a two-dimensional drawing of a patient skeleton, onto which the Oncologist has drawn the area of interest 309.

In some cases, a patient outline (taken via an external camera 324, such as an infra-red camera) can be used to position the imaging volume even with patient covers partially hiding the patient.

With survey scans, extra time is spent or additional radiation given to the patient. Patient outlines suffer from inaccuracies, as the bone-based positioning of the volume is error prone and difficult.

Some examples may overlay a skeleton model (pseudo radiographic image 600) merged with (e.g., on top of) the patient outline 124 or shows the skeleton instead of the patient outline. This helps the manual positioning of the scanning volume 309. Another example could display different organs, such as soft tissue organs, merged with the patient outline.

Another example uses the positioning input from the oncologist (or other operator) to move the patient into the scanner isocenter and automatically positions the scanning volume to cover the input volume. The overlaid organ and/or skeleton models, together with the patient outline, can still be shown for user confirmation.

In one example a method is provided for using, e.g., a machine learning approach, to train an algorithm to fit in a skeleton (600) inside the patient outline based on prior photograph-survey scan pairs (130, 132) acquired with conventional simulation scans. As a result of the training, the algorithm is able to generate survey-like graphics when presented with a photograph.

Generation of the training data can be arranged with an infra-red camera 324 (or optical camera) positioned above the patient 318. Images 130 can be taken with initial patient positioning (without mechanical obstacles, such as MR coils). Resulting survey scan 132 is stored to form a photograph-survey scan pair. The conventional survey scans can be simplified with maximum-intensity-projection (MIP) into a two-dimensional image that is easy to match with a two-dimensional patient photograph. As a result of the training, the algorithm is able to generate a MIP image when presented with a photograph.

In another example, a single photograph is replaced with photographs from multiple directions for redundancy/stereotactic vision with improved skeleton model. With stereotactic information, improved 3D skeleton model could be created for 3D volume positioning. In this case, deep learning network can be used that is able to match 3D survey or actual scan with the 3D photographic data. The scan can be simplified by thresholding or segmenting the survey volume to show only targeted organs or bones. As a result of the training, the algorithm is able to generate 3D representation of the organs or skeleton when presented with stereotactic photographs.

Figure 6:
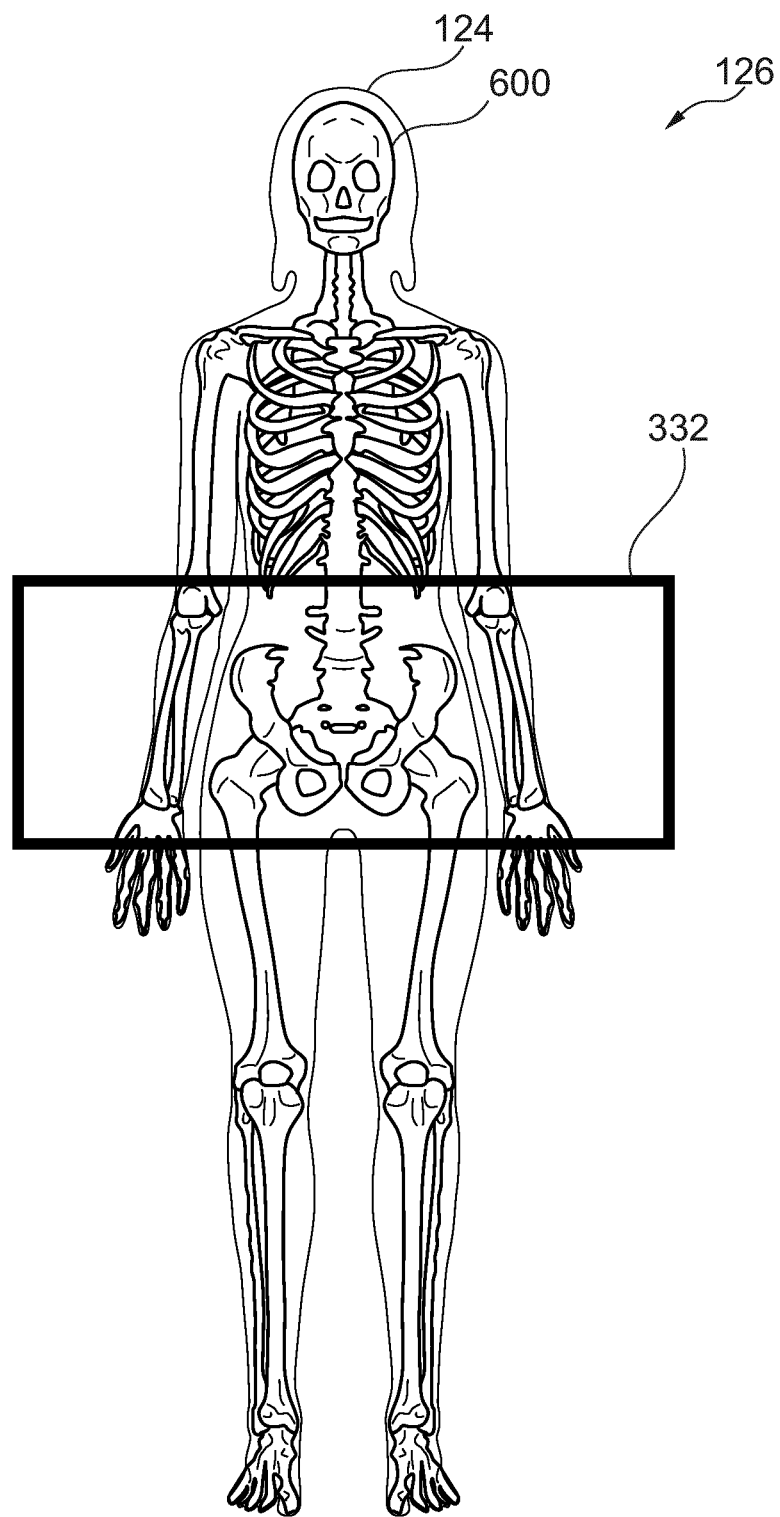
FIG. 6 illustrates an example of a pseudo radiographic image.

FIG. 6 illustrates an example of an output image 126. The output image 126 comprises a ghost or highlight of the original optical image 124. On the original optical image 124 a pseudo radiological image 600 is superimposed. Using the output image 126 a radiologist or other technician is able better to infer the various anatomical locations within the subject. In the example in FIG. 6 the output image 126 was placed on a display and the operator or radiologist drew the box 332. In this case the box 332 represents location data. The location data 332 indicates the region of the subject that the operator or radiologist desires to image or scan.

FIG. 7 shows schematically one method of training an image transformation neural network 122. In this example an infra-red image 702 is used as an optical training image 130; an outline from an oncologist 700 is used as the radiological training image 132. Both of these are inputs 704 into a deep learning algorithm 706. The output of the deep learning algorithm 706 is output 708 into a training routine 710. The training routine 710 also takes a number of expected values 712. These could for example be a measured table movement 714 and also an expected scan volume 716 on a scanner iso-center. The scan volume 716 may correspond to a region of interest 309.

As illustrated in FIG. 7, the boxed skeleton model 132 and photograph(s) 130 are fed into the training algorithm 706 as an input 704. The algorithm is trained to create output for tabletop movement (if photographed outside the scanning bore) and the scanning volume coordinates 714 that match the user-generated values that have been recorded when the training data was created.

While the invention has been illustrated and described in detail in the drawings and foregoing description, such illustration and description are to be considered illustrative or exemplary and not restrictive; the invention is not limited to the disclosed embodiments.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measured cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

LIST OF REFERENCE NUMERALS 100 medical instrument
102 computer
104 processor
106 hardware interface
108 user interface
110 memory
120 machine executable instructions
122 image transformation neural network
124 optical image
126 output image (comprising a pseudo radiographic image)

130 optical training image
132 radiological training image
134 test image
136 difference between radiological training image and test image
200 receive the optical image of the subject
202 generate the output image by inputting the optical image into the image transformation neural network
300 medical imaging system
302 magnetic resonance imaging system
304 magnet
306 bore of magnet
308 imaging zone
309 region of interest
310 magnetic field gradient coils
312 magnetic field gradient coil power supply
314 radio-frequency coil
316 transceiver
318 subject
320 subject support
322 actuator for subject support
324 camera
330 pulse sequence commands
332 location data
334 location of region of interest
336 anatomical image
338 registration of anatomical image to output image
340 semantic location descriptor
342 location finding neural network
344 magnetic resonance data
346 magnetic resonance image
500 control the camera to acquire the optical image of the subject
502 register the location of the subject to the coordinate system of the medical imaging system using the output image
504 determine location data using the pseudo radiographic image
506 determine the region of interest using the location data
508 control the medical imaging system to acquire the measured radiographic image from the subject from the region of interest
600 pseudo radiological image
700 outline from oncologist
702 infra-red image
704 input
706 deep learning algorithm
708 output
710 train
712 expected values
716 measured table movement
718 scan volume on scanner isocenter

The invention claimed is:

1. A medical instrument comprising:
a medical imaging system configured for acquiring a measured radiographic image of a subject;
a subject support configured for supporting the subject in the medical imaging system;
a camera configured to acquire the optical image of the subject on the subject support, wherein images acquired using the camera are registered to a coordinate system of the medical imaging system;
a memory storing machine executable instructions and an image transformation neural network trained for transforming the optical image of the subject into an output image, wherein the output image comprises a pseudo radiographic image, wherein the pseudo radiographic image is aligned with the optical image; and
a processor configured for controlling the medical imaging system, wherein execution of the machine executable instructions causes the processor to:
control the camera to acquire the optical image of the subject;
receive the optical image of the subject;
generate the output image by inputting the optical image into the image transformation neural network; and
register the location of the subject to the coordinate system of the medical imaging system using the output image.

2. The medical instrument of claim 1, wherein the medical instrument further comprises a display and a user interface, wherein execution of the machine executable instructions further causes the processor to:
display the output image on the display; and
receive location data from the user interface, wherein the location data is descriptive of at least one location in the output image.

3. The medical instrument of claim 2, wherein the medical imaging system is configured for acquiring the measured radiographic image from a region of interest, wherein execution of the machine executable instructions further causes the processor to:
determine the region of interest using the location data; and
control the medical imaging system to acquire the measured radiographic image from the subject from the region of interest.

4. The medical instrument of claim 1, wherein execution of the machine executable instructions further causes the processor to:
receive an anatomical image, wherein the anatomical image comprises location markers;
calculate a registration by registering the anatomical image to the pseudo radiographic image; and
determine location data from the location markers by applying the registration of the anatomical image to the output image.

5. The medical instrument of claim 1, wherein the memory further contains a location finding neural network configured for receiving the output image and a semantic location descriptor, wherein the location finding neural network is trained for outputting location data identifying a location of the semantic location descriptor in the output image;
processing wherein execution of the machine executable instructions further causes the processor to:
receive the semantic location descriptor of an anatomical location; and
determine location data by inputting the output image and the semantic location descriptor into the location finding neural network.

6. The medical instrument of claim 1, wherein the medical imaging system is at least one of the following: a positron emission tomography system, a single photon emission tomography system, a computed tomography system, an x-ray machine, or a magnetic resonance imaging system.

7. The medical instrument of claim 1, wherein the camera is at least one of the following: an optical camera or an infra-red camera.

8. The medical instrument of claim 1, wherein execution of the machine executable instructions further causes the processor to:

receive matched pairs of optical training images and radiological training images;

input one of the optical training images into the image transformation neural network to generate a test image, wherein there is a matching radiological training image selected from the radiological training images that is a matched pair of the one of the optical training images; and train the image transformation neural network using a difference between the test image and the matching radiological training image.

9. The medical instrument of claim 1, wherein the pseudo radiographic image is at least one of the following: a pseudo X-ray, a pseudo magnetic resonance image, a projection of a pseudo magnetic resonance image onto a plane, a cross section of a pseudo magnetic resonance image, a pseudo positron emission tomography image, a projection of a pseudo positron emission tomography image onto a plane, a cross section of a pseudo positron emission tomography image, a pseudo computed tomography image, a projection of a pseudo computed tomography image onto a plane, or a cross section of a pseudo computed tomography image.

10. The medical instrument of claim 1, wherein any one of the following: the output image is the pseudo radiological image or the output images is a superposition of the optical image on the pseudo radiological image.

11. The medical instrument of claim 1 wherein the output image is used in place of a survey image to register the location of the subject to the coordinate system of the medical imaging system using the output image.

12. A computer program product comprising machine executable instructions stored on a non-transitory computer readable medium for execution by a processor controlling a medical instrument, wherein the medical instrument comprises a medical imaging system configured for acquiring a measured radiographic image of a subject, wherein the medical instrument further comprises a subject support configured for supporting the subject in the medical imaging system, wherein the medical instrument further comprises a camera configured for acquiring the optical image of the subject on the subject support, wherein the images acquired using the camera are registered to a coordinate system of the medical imaging system;

wherein the computer program product further comprises an implementation of an image transformation neural network trained for transforming an optical image of a subject into an output image, wherein the output image comprises a pseudo radiographic image, wherein the pseudo radiographic image is aligned with the optical image, wherein execution of the machine executable instructions cause the processor to:

control the camera to acquire the optical image of the subject;

receive the optical image of the subject;

generate the output image by inputting the optical image into the image transformation neural network and register the location of the subject to the coordinate system of the medical imaging system using the output image.

13. A medical imaging method, wherein the method comprises:

controlling a camera to acquire the optical image of a subject, wherein the camera is configured for acquiring the optical image of the subject on a subject support of a medical imaging system, wherein the medical imaging system is configured for acquiring a measured radiographic image of the subject, wherein the subject support is configured for supporting the subject in the medical imaging system, wherein images acquired using the camera are registered to a coordinate system of the medical imaging system;

receiving an optical image of a subject; and generating an output image by inputting the optical image into an image transformation neural network, wherein the image transformation neural network is trained for transforming the optical image of the subject into the output image, wherein the output image comprises a pseudo radiographic image, wherein the pseudo radiographic image is aligned with the optical image and registering the location of the subject to the coordinate system of the medical imaging system using the output image.

14. The medical imaging method of claim 13, wherein the method further comprises:

receiving matched pairs of optical training images and radiological training images;

inputting one of the optical training images into the image transformation neural network to generate a test image, wherein there is a matching radiological training image selected from the radiological training images that is a matched pair of the one of the optical training images; and training the image transformation neural network using a difference between the test image and the matching radiological training image.

\* \* \* \* \*